United States Patent
Padiou et al.

(10) Patent No.: US 11,772,322 B2
(45) Date of Patent: Oct. 3, 2023

(54) METHOD OF ADDITIVELY MANUFACTURING AN OPHTHALMIC LENS WITH AT LEAST ONE ADDED FUNCTION

(71) Applicant: Essilor International, Charenton-le-Pont (FR)

(72) Inventors: Jean-Marc Padiou, Charenton-le-Pont (FR); Mathieu Feuillade, Charenton-le-Pont (FR); Alexandre Gourraud, Charenton-le-Pont (FR); Loïc Quere, Charenton-le-Pont (FR); Olivier Roussel, Charenton-le-Pont (FR)

(73) Assignee: Essilor International, Charenton-le-Pont (FR)

(*) Notice: Subject to any disclaimer, the term of this patent is extended or adjusted under 35 U.S.C. 154(b) by 25 days.

(21) Appl. No.: 16/770,848

(22) PCT Filed: Dec. 5, 2018

(86) PCT No.: PCT/EP2018/083699
§ 371 (c)(1),
(2) Date: Jun. 8, 2020

(87) PCT Pub. No.: WO2019/110692
PCT Pub. Date: Jun. 13, 2019

(65) Prior Publication Data
US 2020/0391434 A1 Dec. 17, 2020

(30) Foreign Application Priority Data
Dec. 6, 2017 (EP) .................................. 17306712

(51) Int. Cl.
*B29C 64/112* (2017.01)
*B29D 11/00* (2006.01)
(Continued)

(52) U.S. Cl.
CPC ............ *B29C 64/112* (2017.08); *B29C 64/40* (2017.08); *B29C 65/48* (2013.01);
(Continued)

(58) Field of Classification Search
CPC ........ B29D 11/00903; B29D 11/00432; B29D 11/0073; B29C 64/112; B29C 64/40; B29C 65/48; B33Y 10/00; B33Y 80/00
See application file for complete search history.

(56) References Cited

U.S. PATENT DOCUMENTS

| | | | |
|---|---|---|---|
| 2006/0065989 A1 | 3/2006 | Druffel et al. | |
| 2009/0091825 A1 | 4/2009 | Saito et al. | |

(Continued)

FOREIGN PATENT DOCUMENTS

| | | | |
|---|---|---|---|
| CN | 204731504 | * | 10/2015 |
| EP | 2878989 A1 | | 6/2015 |

(Continued)

OTHER PUBLICATIONS

International Search Report, dated Feb. 13, 2019, from corresponding PCT application No. PCT/EP2018/083699.

(Continued)

*Primary Examiner* — Mathieu D Vargot
(74) *Attorney, Agent, or Firm* — NIXON & VANDERHYE

(57) ABSTRACT

A method of manufacturing an ophthalmic lens having at least one optical function includes: a step of additively manufacturing a complementary optical element by depositing a plurality of predetermined volume elements on a predetermined build support, the complementary optical element being configured to provide at least a part of the optical function of the ophthalmic lens, wherein the build support includes at least one added value or adhesive configured to provide to the ophthalmic lens at least one (Continued)

added function. An ophthalmic lens including a build support and a complementary optical element as well as an ophthalmic lens obtained by such a manufacturing method.

15 Claims, 2 Drawing Sheets

(51) Int. Cl.
| | | |
|---|---|---|
| | *B29C 64/40* | (2017.01) |
| | *B29C 65/48* | (2006.01) |
| | *B33Y 10/00* | (2015.01) |
| | *B33Y 80/00* | (2015.01) |
| | *B29L 11/00* | (2006.01) |

(52) U.S. Cl.
CPC . *B29D 11/00903* (2013.01); *B29L 2011/0016* (2013.01); *B33Y 10/00* (2014.12); *B33Y 80/00* (2014.12)

(56) References Cited

U.S. PATENT DOCUMENTS

| | | |
|---|---|---|
| 2015/0153589 A1 | 6/2015 | Meschenmoser et al. |
| 2015/0241714 A1 | 8/2015 | Allione et al. |
| 2016/0161761 A1 | 6/2016 | Quere et al. |
| 2016/0167323 A1* | 6/2016 | Valeri .............. B29D 11/00432 264/2.6 |
| 2017/0165931 A1 | 6/2017 | Wolterink et al. |

FOREIGN PATENT DOCUMENTS

| | | |
|---|---|---|
| EP | 3311994 A1 | 4/2018 |
| JP | 2012-197390 A | 10/2012 |

OTHER PUBLICATIONS

Office Action issued in Japanese Patent Application No. 2020-530997 dated Nov. 7, 2022.

* cited by examiner

METHOD OF ADDITIVELY MANUFACTURING AN OPHTHALMIC LENS WITH AT LEAST ONE ADDED FUNCTION

BACKGROUND OF THE INVENTION

Field of the Invention

The invention relates to the field of the manufacture of ophthalmic lenses having at least one optical function. The invention concerns more specifically a method of manufacturing an ophthalmic lens. The invention further concerns an ophthalmic lens obtained at least partly by additive manufacturing.

Description of the Related Art

Methods for manufacturing ophthalmic lenses with a complementary optical element obtained by additive manufacturing are known. These methods involve a step of obtaining the complementary optical element by depositing a plurality of predetermined volumes of material on a build support. Said complementary optical element is then transferred, with or without the build support, onto a starting optical system to form an ophthalmic lens.

However, it is difficult to add added values to the ophthalmic lens with these methods. Indeed, it has been observed that manufacturing the complementary optical element with additive manufacturing methods generates waves on the external surface thereof rendering the surface quality unsatisfactory. Furthermore, providing added functions to the ophthalmic lens are difficult when the ophthalmic lens comprises a complementary optical element obtained by additive manufacturing. Added functions are for example a polarization or tinting filter, a hard-coat function, an anti-reflective function, a protective coat and a surface quality function.

A problem that the invention aims to solve is thus to provide a method of manufacturing an ophthalmic lens by additive manufacturing wherein it is easier to provide added values to the ophthalmic lens.

SUMMARY OF THE INVENTION

To solve this problem, the invention provides method of manufacturing an ophthalmic lens having at least one optical function, comprising:
  a step of additively manufacturing a complementary optical element by depositing a plurality of predetermined volume elements on a predetermined build support, the complementary optical element being configured to provide at least a part of the optical function of the ophthalmic lens,
wherein the build support comprises at least one added value or adhesive configured to provide to the ophthalmic lens at least one added function.

Such a build support with at least one added value or adhesive has a combined action allowing to first provide a support for the additive manufacturing that may be integrated into the ophthalmic lens and then provide at least one added function to the ophthalmic lens. Using this build support allows to facilitate manufacturing of the ophthalmic lens because the addition of the added function is integrated to the additive manufacturing process rather than an additional step following thereof. Furthermore, it has been observed that it is easier and more efficient to provide the at least one added function by means of the build support than with an additional step following a transfer of the complementary optical element onto the starting optical system.

According to an embodiment of the manufacturing method, the build support comprises at least one added value other than an adhesive.

According to an embodiment of the manufacturing method, the shape and the optical power of the complementary optical element are predetermined as a function of the desired optical function of the ophthalmic lens.

According to an embodiment of the manufacturing method, the complementary optical element is fixed, adhered, and/or reported onto a starting optical system after the step of additively manufacturing a complementary optical element so as to form the ophthalmic lens.

According to an embodiment of the manufacturing method, the complementary optical element is assembled to a starting optical system with the build support remaining on the complementary optical element during the assembling step.

According to an embodiment of the manufacturing method, the complementary optical element is assembled to the starting optical system so that the build support is disposed between the starting optical system and the complementary optical element.

According to an embodiment of the manufacturing method, the build support is removed from the complementary optical element during or after the assembling step to obtain an ophthalmic lens free of build support.

According to an embodiment of the manufacturing method, the method comprises a step of gluing in which a gluing element having adhesion properties is provided to or comprised in at least one among the complementary optical element, the starting optical system and the build support.

According to an embodiment of the manufacturing method, it further comprises, before the assembling step, a step of adding the at least one added value or adhesive onto an external surface of the build support intended to receive the complementary optical element, said at least one added value or adhesive being configured to remain on the complementary optical element if the build support is removed from the complementary optical element.

According to an embodiment of the manufacturing method, said at least one added function is provided after the assembling step.

According to an embodiment of the manufacturing method, the build support is a film.

According to an embodiment of the manufacturing method, the build support is configured to transfer said at least one added value or adhesive to the complementary optical element when the complementary optical element contacts the build support.

According to an embodiment of the manufacturing method, the at least one added function is one among a polarization or tinting filter, a hard-coat function, an anti-reflective function, a protective coat and a surface quality function.

The invention also provides an ophthalmic lens having at least one optical function, comprising:
  a build support, and
  a complementary optical element obtained by additive manufacturing by depositing a plurality of predetermined volume elements on the predetermined build support, the complementary optical element providing at least a part of the optical function of the ophthalmic lens, wherein the build support comprises at least one added value or adhesive configured to provide to the ophthalmic lens at least one added function The invention further provides an ophthalmic lens having at least one optical function, the ophthalmic lens being obtained by the manufacturing method as described above, the ophthalmic lens comprising:

a complementary optical element, the complementary optical element providing at least a part of the optical function of the ophthalmic lens, the complementary optical element being obtained by additively manufacturing by depositing a plurality of predetermined volume elements on a predetermined build support, wherein the build support comprises at least one added value or adhesive configured to provide to the ophthalmic lens at least one added function.

According to an embodiment of the ophthalmic lens, it further comprises a starting optical system assembled to a surface of the complementary optical element.

According to an embodiment of the ophthalmic lens, the build support is disposed between the complementary optical element and the starting optical system.

BRIEF DESCRIPTION OF THE DRAWINGS

The invention is described in more detail below by way of the figures that show only one preferred embodiment of the invention.

DESCRIPTION OF THE PREFERRED EMBODIMENTS

Figure 1:
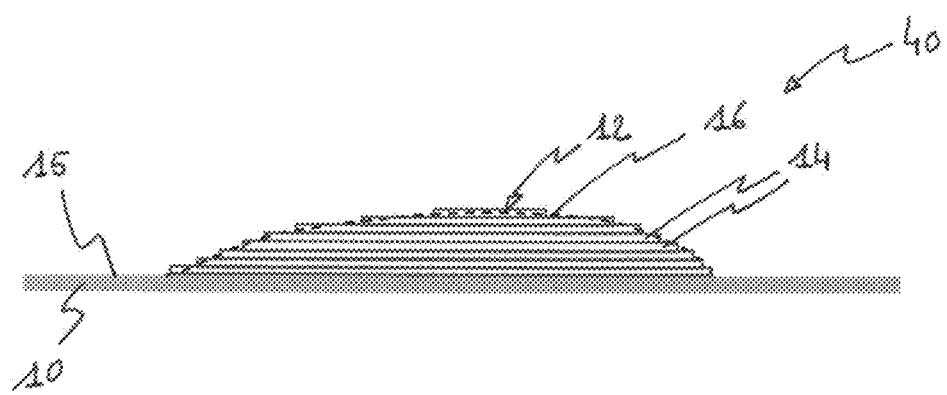
FIG. 1 schematically shows an ophthalmic lens obtained by the deposition of predetermined volumes on a build support.

As shown on FIG. 1, an ophthalmic lens 40 having at least one optical function is provided. A method of manufacturing such an ophthalmic lens 40 is also provided. The ophthalmic lens 40 comprises a build support 10 and a complementary optical element 12 providing at least a part of the optical function of the ophthalmic lens 40.

It will be recalled that the optical function of a lens, of a system or of an optical element means the optical response of this lens or of this system or of this element, namely a function that defines any modification in the propagation and transmission of an optical beam through the lens, the system or the optical element concerned, whatever the angle of incidence of the incident optical beam and whatever the geometric extent of an input diopter illuminated by the incident optical beam. Said at least one optical function may be simple or complex.

More specifically, in the field of ophthalmics, the optical function is defined as the distribution of wearer power and astigmatism characteristics and of higher-order aberrations associated with the lens, with the system or with the optical element for all the directions of gaze of a wearer of this lens, of this system or of this element. That of course assumes that the geometric positioning of the lens, of the system or of the optical element with respect to the eye of the wearer has been predetermined.

The complementary optical element 12 is obtained by a step of additively manufacturing the complementary optical element 12 by depositing a plurality of predetermined volume elements 14 on the build support 10. By additive manufacturing it is meant a manufacturing technology as defined in the international standard ASTM 2792-12, which mentions a process of joining materials to make objects from 3D model data, usually layer upon layer, as opposed to subtractive manufacturing methodologies, such as traditional machining. The additive manufacturing method may be selected in, but is not limited to, the list consisting of stereolithography, mask stereolithography or mask projection stereolithography, polymer jetting, scanning laser sintering or SLS, scanning laser melting or SLM, fused deposition modeling or FDM.

The complementary optical element 12 is formed by the plurality of predetermined volume elements 14 which are juxtaposed and superposed to form a plurality of superposed layers of a material. Dimensions of each of the superposed layers are chosen to fit a predetermined profile 16 of the complementary optical element 12 (dotted line). Preferably, the layers each have a thickness that is constant over the length and all have the same thickness. The thickness of these layers is between 0.1 µm and 100 µm, preferably between 0.5 µm and 10 µm. The minimum thickness of the predetermined volume elements 14 mainly depends on the additive manufacturing method that is used to obtain the complementary optical element 30. It will be noted that this equality of thickness may be obtained by virtue of a controlled and commanded spraying, by a nozzle or spray line of a manufacturing machine, of a determined quantity of predetermined volume elements for each superposed layer of material. It will be also noted that the material of the complementary optical element 12 is compatible with additive manufacturing. Preferably, the material is an acrylic polymer, more specifically a photopolymer, for example a photopolymer such as the product marketed by the company OBJET Ltd, under the trade name of VeroClear.

It will be noted that additive manufacturing here corresponds to a three-dimensional printing or stereolithography method, or even to a method of fused filament fabrication. Preferably, the additive manufacture is one among polymer jetting and stereolithography.

On FIG. 1, the complementary optical element 12 has a curved, more specifically convex, front side and a planar back side. Depending on the desired optical function of the ophthalmic lens 40, the front and back sides of the complementary optical element 12 may be each planar or curved. Shape of the complementary optical element 12, or predetermined profile 16, is determined depending on the desired optical function of the ophthalmic lens 40. In this instance, "planar" does not necessarily mean "smooth" and does not necessarily exclude the presence of roughness. Furthermore, "planar" surface means that this surface has a curvature close to zero.

It will be noted that the additive manufacture of the complementary optical element 12 may comprise, in addition to the deposition of the plurality of successive and superposed layers, one or more photopolymerization steps. It will also be noted, that the polymerization of the complementary optical element 12 may not be completely over at the end of the step of additive manufacture of this complementary optical element 12. In this later case, a final polymerization of the complementary optical element 12 may be totally completed during or after assembling step to adapt the shape of the complementary optical system 12 to a substrate on which it is then transferred.

The build support 10 comprises at least one added value or adhesive configured to provide to the ophthalmic lens 40 at least one added function. Preferably, the build support 10 comprises at least one added value other than an adhesive configured to provide to the ophthalmic lens 40 at least one added function. This at least one added function is one among a polarization or tinting filter, a hard-coat function, an anti-reflective function, a protective coat and a surface quality function.

Added values under the meaning of the invention are layers or elements that modify the mechanical or optical properties of the ophthalmic lens without influencing the optical power of said ophthalmic lens. A non exhaustive list of added values can be found hereafter: anti-scratch layers, also called hard-coats or abrasion resistant coatings, anti-shock layers, sometimes called primer layers or coatings, tinted layers or dyes, photochromic layers or dye, polarized layers, antistatic layers, anti-reflective layers or stacks, mirrors or partial mirror layers, filtering layers that selectively absorb or reflect one or more wavelength within the near Ultraviolet, the visible or near infra-red wavelength ranges, hydrophobic, hydrophilic or oleophobic layers, also known as anti-smudge or anti-fog layers, and also active layers comprising liquid crystals or other elements activated by an electric signal.

The build support 10 may be configured to transfer said at least one added value or adhesive to the complementary optical element 12 when the complementary optical element 12 contacts the build support 10. The manufacturing method may comprise, before the assembling step, a step of adding the at least one added value or adhesive onto an external surface of the build support 10 intended to receive the complementary optical element 12. In this case, said at least one added value or adhesive is configured to remain on the complementary optical element 12 if the build support 10 is removed from the complementary optical element 12. As an example, the added value may be a specific surface quality provided by the internal side of the build support 10 to the complement optical element 12. Alternatively, said at least one added function may be provided after the assembling step.

Advantageously, the adhesive is defined as being a layer configured to ease the adhesion of the complementary optical element 12 on the build support 10. In a variant, the adhesive is configured to be used in a later step of the manufacturing method.

To ease manufacturing of the ophthalmic lens 40, the build support 10 may be a film. In other words, the build support 10 is a thin sheet or membrane. Forming the build support as a film allows the build support to be selectively shaped to ease manufacturing of the ophthalmic lens. As an example, the build support may be initially flat to facilitate additive manufacturing and to allow manufacturing of several complementary optical element on a single build support. Then, the build support formed as a film may be bent to have a curved shape corresponding to a surface on which the build support has to be disposed. Furthermore, the complementary optical element may be bent together with the build support to improve handling and positioning of the complementary optical element onto a substrate, as a starting optical system. Therefore, the build support as a film allows to optimize and facilitate the manufacturing method from the manufacturing of the complementary optical element to a potential transfer of the complementary optical element onto a substrate.

The build support 10 is preferably flexible. In this way, the build support 10 may be selectively shaped. Particularly, the flexibility of the build support 10 makes it possible to shape or bend the complementary optical element 40 together with the build support 10 so that handling of the complementary optical element 40 is facilitated. This step of shaping or bending may be a thermoforming step when the build support 10 is a thermoset material. The curved shape of the complementary optical element 12 may be a final or intermediate shape. Alternatively, the film may be rigid.

The build support 10 may be in the form of a patch. It will be noted that a patch differs from a film in that the patch has a mechanical behavior allowing the build support 10 to support its own weight so as to remain in a predetermined position or shape. Preferably, the patch has a predetermined flexibility allowing the build support 10 to be easily shaped or bent under a predetermined stress.

The build support 10 comprises a body provided with a build surface 15 which in this instance is of planar overall shape. The build support 10 may be curved or bent before the step of additive manufacturing to obtain a complementary optical element 12 in a final shape, for example a shape close to the curvature of a substrate on which the complementary optical element 12 is intended to be then disposed.

The build support 10 is preferably made of Cellulose Triacetate (TAC) or polycarbonate or Polyethylene terephthalate (PET). The thickness of the build support 10 is preferably between 50 µm and 500 µm, most preferably between 100 µm and 300 µm.

The build support 10 may be configured to be used with a plurality of complementary optical elements 12 successively manufactured on the build support 10. In other words, a plurality of complementary optical elements 12 intended to be part of different ophthalmic lenses 40 may be additively manufactured on a single build support 10. Said plurality of complementary optical elements 12 may be then separated with an additional step of cutting the build support 10 between each of the complementary optical elements 12. In doing so, additive manufacturing of complementary optical elements 12 may be automated. Preferably, the build support 10 is in the form of a roll which is rolled out to receive the additively manufactured complementary optical elements 12.

In a preferred embodiment, the build support 10 is part of the ophthalmic lens 40. In other words, the build support 10 remains in contact with the complementary optical element 12 to form the ophthalmic lens 40. The build support 10 may be disposed either on a first surface of the complementary optical element 12 intended to face an eye of a user when the ophthalmic lens 40 is mounted on a frame worn by the user or on a second surface opposite to the first surface.

Figure 2:
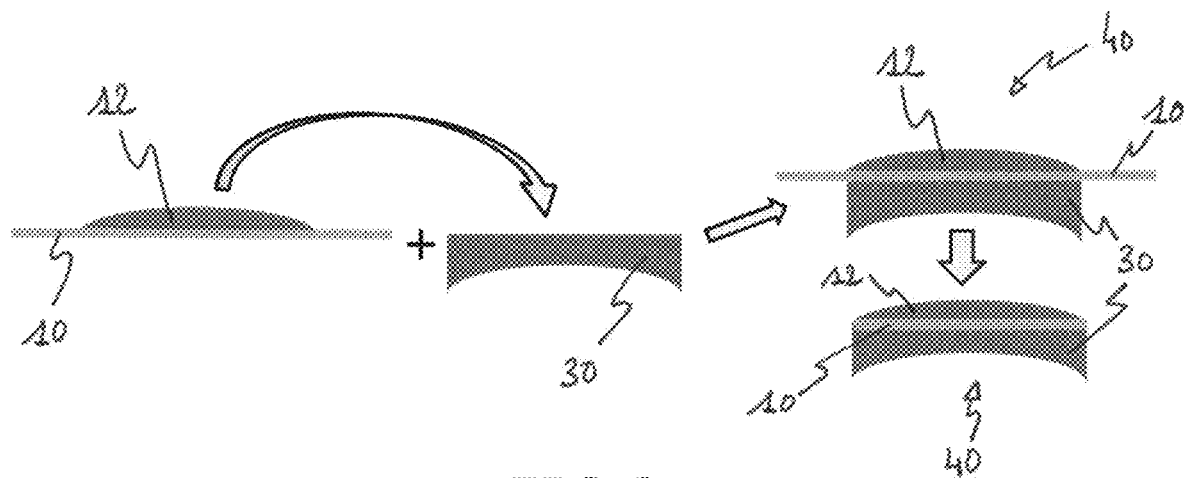
FIGS. 2 to 4 each schematically shows various steps of an embodiment of a method of manufacturing an ophthalmic lens comprising a complementary optical element, a build support and a starting optical system.
Figure 3:
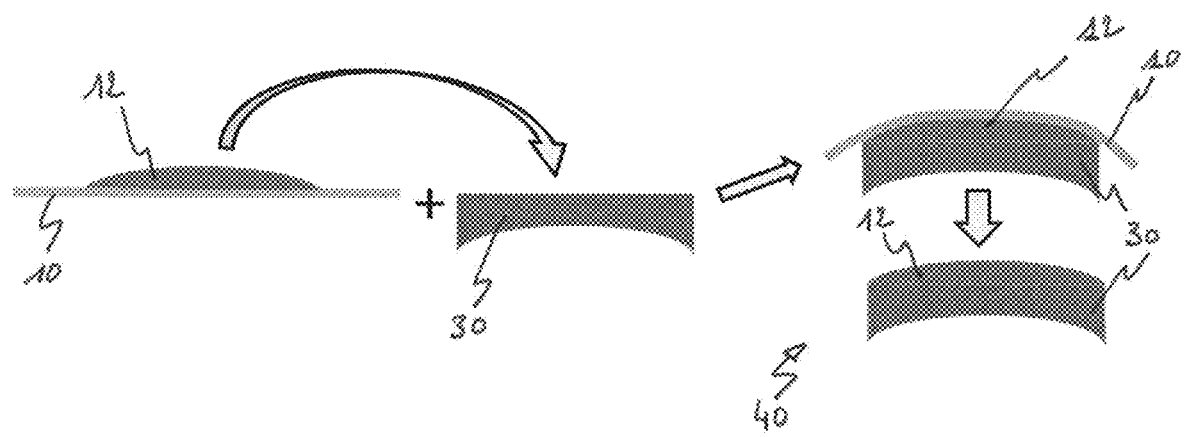
Figure 4:
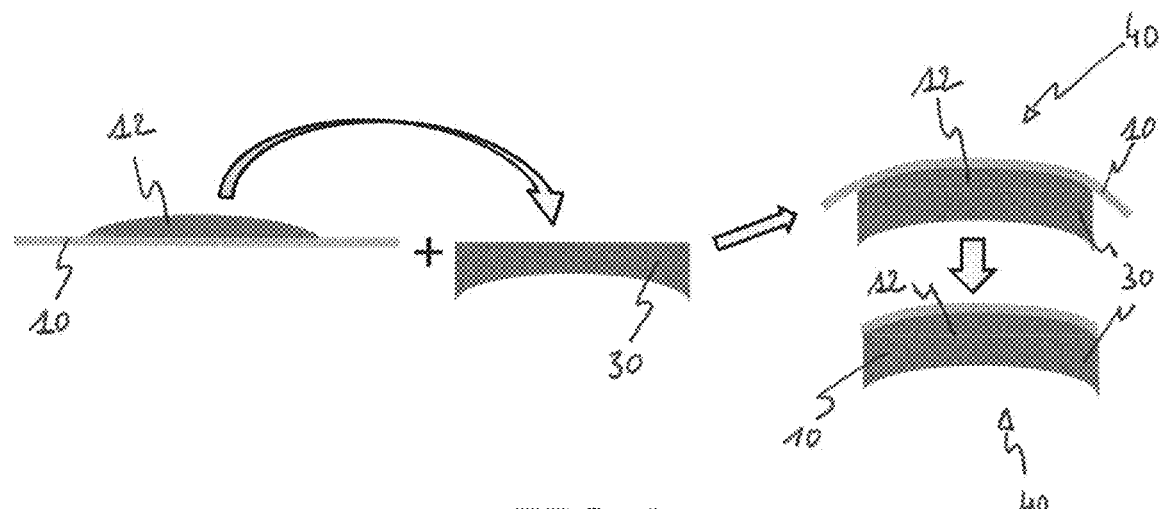

As shown in FIGS. 2-4, the ophthalmic lens 40 may further comprises a starting optical system 30 assembled to a surface of the complementary optical element 12. The starting optical system 30 may have an initial optical function. It will be noted that it is chiefly the complementary optical element 12 which confers the optical function on the ophthalmic lens 40, even if the starting optical system 30 already has a simple or complex optical function. In other words, without this complementary optical element 12, the ophthalmic lens 40 cannot exhibit the optical function prescribed for it. This complementary optical element 12 therefore has nothing to do with a simple surface coating, such as an antireflective coating, an antifog coating, a scratchproof coating or even a dirt-resistant coating.

This starting optical system 30 is preferably made of a material generally used for the manufacture of ophthalmic lens, such as the allylic polymer known by the name CR39. The starting optical system 30 may also be made of polycarbonate or MR7 polymer. The starting optical system 30 may be manufactured by casting, injection, surfacing or by additive manufacturing.

The starting optical system 30 is preferably a thin lens which power is around to the planned Rx. Particularly, the starting optical system 30 has a local thickness which is higher than 0.3 mm and preferably higher than 0.5 mm. The starting optical system 30 may be spherical, torical or progressive. On FIGS. 2-4, the starting optical system has a planar front side and a curved back side. Depending on the desired optical function, the front and back sides of the starting optical system 30 may be each planar or curved.

The complementary optical element 12 may be fixed, adhered, and/or reported onto the starting optical system 30 after the step of additively manufacturing the complementary optical element 12 so as to form the ophthalmic lens.

In a preferred embodiment, the complementary optical element 12 is transferred on a surface of the starting optical system 30, preferably using lamination processes. This transfer may be performed by a film applicator method, a pad printing method, a membrane applicator or a combination thereof.

In the film applicator method, the build support 10 is maintained by its edge and the starting optical system 10 is pushed against the complementary optical element 12. This method may be performed under vacuum to complete the adhesion of the different layers.

In the pad printing method, a deformable stamp presses the complementary optical element 12 together with the build support 10 onto the starting optical system 30. The stamp is preferably made of rubber. This pad printing method is preferably performed when the complementary optical element 12 has to be transferred on a concave surface. The membrane applicator method is very close to the pad printing method but differs from this latter method in that the rubber stamp is replaced by an inflated membrane.

The shape and the optical power of the complementary optical element 12 are preferably predetermined as a function of the desired optical function of the ophthalmic lens 40. Particularly, a geometric transfer law is used to determine the deformation characteristics of the complementary optical element 12 when it is transferred onto the starting optical system 30. Such a geometric transfer law is for example defined in the document US 2015/0241714 A1.

The build support 10 may be configured to transfer said at least one added value or adhesive to the complementary optical element 12 when the complementary optical element 12 contacts the build support 10. The manufacturing method may comprise, before the assembling step, a step of adding the at least one added value or adhesive onto an external surface of the build support 10 intended to receive the complementary optical element 12. In this case, said at least one added value or adhesive is configured to remain on the complementary optical element 12 if the build support 10 is removed from the complementary optical element 12. As an example, the added value may be a specific surface quality provided by the internal side of the build support 10 to the complement optical element 12. Alternatively, said at least one added function may be provided after the assembling step.

The complementary optical element 12, with or without the build support 10, may be selectively assembled on the front side or on the back side of the starting optical system 30. In other words, the complementary optical element 12 may be selectively assembled on the surface of the starting optical system 30 which is intended to face the eye of the wearer or on the opposite surface. In addition, the build support 10 may be disposed on the first or second surface of the complementary optical element 12.

Furthermore, as indicated above, the build support 10 may be part of the ophthalmic lens 40 or removed during or after the assembling step.

When the build support 10 is part of the ophthalmic lens 40 as shown on FIGS. 2 and 4, the complementary optical element 12 is assembled to the starting optical system 30 with the build support 10 remaining on the complementary optical element 12 during an assembling step.

The build support 10 may be disposed between the complementary optical element 12 and the starting optical system 30 or as an external layer of the ophthalmic lens 40. When the build support 10 is disposed between the complementary optical element 12 and the starting optical system 30 as shown on FIG. 2, the complementary optical element 12 is assembled to the starting optical system 30 so that the build support 10 is disposed between the starting optical system 30 and the complementary optical element 12.

When the build support 10 is an external layer of the ophthalmic lens 40 as shown on FIG. 4, the complementary optical element 12 is disposed between the build support 10 and the starting optical system 30. An optional step of edging the build support 10 may be performed to make the peripheral edge of the build support 10 correspond to the external edge of the complementary optical element 12 and the starting optical system 30.

When the ophthalmic lens 40 has to be free of build support 10 after assembling step as shown on FIG. 3, the build support 10 is removed from the complementary optical element 12 during or after the assembling step. In this case, the added value may be a function that eases removing the build support 10 from the complementary optical element 12, as a fluorized polymer. Removing the build support 10 from the complementary optical element 12 allows to get an improved optical quality of the external surface of the complementary optical element 12 without any smoothing additional step. The optical quality of the external surface of the complementary optical element 12 is thus provided by the build support 10.

FIGS. 2-4 schematically show various steps of three embodiments of the method of manufacturing the ophthalmic lens 40. First, the complementary optical element 12 is additively manufactured on the build support 10. Then, the complementary optical element 12 and the build support 10 are transferred onto the starting optical system 30 to form the ophthalmic lens 40. In the embodiment shown on FIGS. 2 and 4, the build support 10 is part the ophthalmic lens 40 so that it remains in contact with the complementary optical element 12 after the transferring step. Particularly, the build support 10 is disposed between the starting optical system 30 and the complementary optical element 12 in the embodiment of FIG. 2 whereas the build support 10 is disposed as an external layer of the ophthalmic lens 40 in the embodiment of FIG. 4. An optional step of edging the build support 10 is then performed to make the peripheral edge of the build support 10 correspond to the external edge of the complementary optical element 12 and the starting optical system 30. Conversely, in the embodiment of FIG. 3, the build support 10 is removed from complementary optical element 12 after transferring it onto the starting optical system 30.

In a preferred embodiment, the manufacturing method comprises a step of gluing in which a gluing element or an adhesive having adhesion properties is provided to or comprised in at least one among the complementary optical element 12, the starting optical system 30 and the build support 10. In the first case, this gluing element may be a gluing layer disposed between two layers of the ophthalmic lens 40. Polymer jetting technology is preferred to deposit the glue layer on a selected area. Most preferably, the same equipment is used for manufacturing the glue layer and the complementary optical element 12. Another advantage of polymer jetting technology is that additive manufacturing machine can have multiple printing heads with various materials. The glue layer may also be deposited by spin or spray coatings. Particularly, spin coating is preferred when deposited onto the starting optical system 30 and spray coating is preferred when deposited onto the build support 10. These spin and spray coatings are specifically interesting to deposit a pressure sensitive adhesive.

The gluing element may be chosen to be activated with light, by thermal curing or by pression.

When the activation is made by ultraviolet light, at least one among the build support 10, the complementary optical element 12 and the starting optical system 30 is at least partially transparent to the activation wavelength.

When the activation is made by thermal curing, the curing temperature is preferably below the glass transition of the build support 10, the complementary optical element 12 and the starting optical system 30 to avoid lens distortion. Thermal activation is preferably used when thermal expansion of the build support 10, the complementary optical element 12 and the starting optical system 30 are close to each other.

When the activation is made by pression, the gluing element is a pressure-sensitive adhesive (PSA) that is preferably at least one of the material of the build support 10.

In case of light or thermal curing activation, the gluing element may be a polymer resin used for manufacturing the complementary optical element 12.

The invention claimed is:

1. A method of manufacturing an ophthalmic lens having at least one optical function, comprising:
    a step of additively manufacturing a complementary optical element by depositing a plurality of predetermined volume elements on a predetermined build support, the complementary optical element being configured to provide at least a part of the optical function of the ophthalmic lens, and
    a step of assembling the complementary optical element to a starting optical system with the build support remaining on the complementary optical element during the assembling step, the build support being disposed as an external layer of the ophthalmic lens with the complementary optical element disposed between the build support and the starting optical system,
    wherein the build support comprises at least one added value configured to provide to the ophthalmic lens at least one added function.

2. The method according to claim 1, wherein the shape and the optical power of the complementary optical element are predetermined as a function of the desired optical function of the ophthalmic lens.

3. The method according to claim 1, wherein the build support is removed from the complementary optical element after the assembling step to obtain an ophthalmic lens free of the build support.

4. The method according to claim 1, wherein the method comprises a step of gluing in which a gluing element having adhesion properties is provided to or comprised in at least one among the complementary optical element, the starting optical system and the build support.

5. The method according to claim 1, further comprising, before the assembling step, a step of adding the at least one added value onto an external surface of the build support intended to receive the complementary optical element, said at least one added value being configured to remain on the complementary optical element if the build support is removed from the complementary optical element.

6. The method according to claim 1, wherein said at least one added function is provided after the assembling step.

7. The method according to claim 1, wherein the build support is a film.

8. The method according to claim 1, wherein the build support is configured to transfer said at least one added value to the complementary optical element when the complementary optical element contacts the build support.

9. The method according to claim 1, wherein the at least one added function is one among a polarization or tinting filter, a hard-coat function, an anti-reflective function, a protective coat and a surface quality function.

10. An ophthalmic lens having at least one optical function, comprising:
    a build support, and
    a complementary optical element obtained by additive manufacturing by depositing a plurality of predetermined volume elements on the build support, the complementary optical element providing at least a part of the optical function of the ophthalmic lens,
    wherein the build support is disposed as an external layer of the ophthalmic lens with the complementary optical element disposed between the build support and a starting optical system, and
    wherein the build support comprises at least one added value configured to provide to the ophthalmic lens at least one added function.

11. An ophthalmic lens having at least one optical function, the ophthalmic lens being obtained by the manufacturing method according to claim 1, the ophthalmic lens comprising:
    a complementary optical element, the complementary optical element providing at least a part of the optical function of the ophthalmic lens,
    the complementary optical element being obtained by additively manufacturing by depositing a plurality of predetermined volume elements on a predetermined build support,
    wherein the build support comprises at least one added value configured to provide to the ophthalmic lens at least one added function, wherein the build support is disposed as an external layer of the ophthalmic lens.

12. The method according to claim 2, wherein the method comprises a step of gluing in which a gluing element having adhesion properties is provided to or comprised in at least one among the complementary optical element, the starting optical system and the build support.

13. The method according to claim 3, wherein the method comprises a step of gluing in which a gluing element having adhesion properties is provided to or comprised in at least one among the complementary optical element, the starting optical system and the build support.

14. The method according to claim 4, further comprising, before the assembling step, a step of adding the at least one added value onto an external surface of the build support intended to receive the complementary optical element, said at least one added value being configured to remain on the complementary optical element if the build support is removed from the complementary optical element.

15. The method according to claim 3, further comprising, before the assembling step, a step of adding the at least one added value onto an external surface of the build support intended to receive the complementary optical element, said at least one added value being configured to remain on the complementary optical element if the build support is removed from the complementary optical element.

\* \* \* \* \*